Nov. 17, 1931.    H. MUELLER    1,832,409
BATTERY CARRIER
Filed Aug. 10, 1929
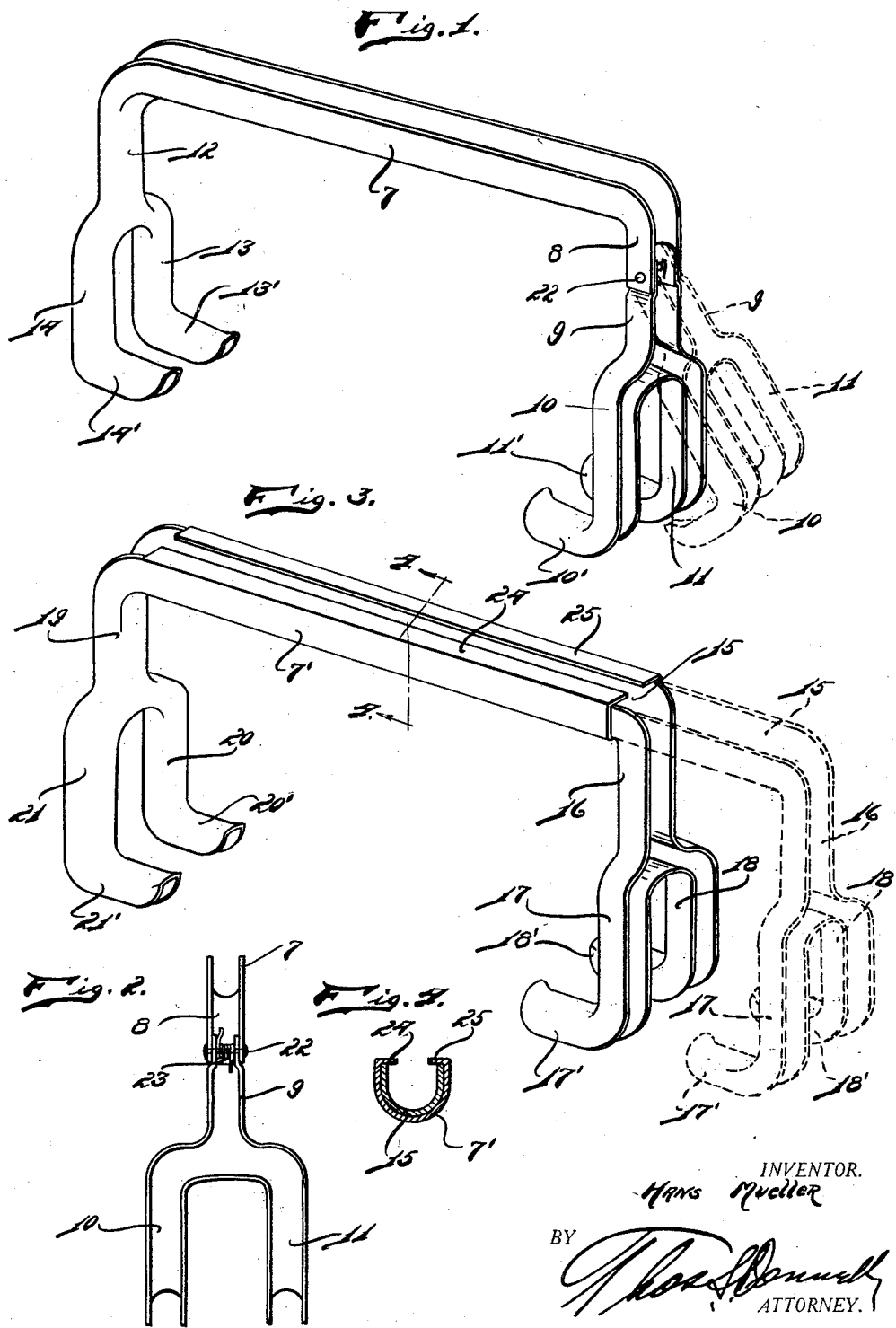
INVENTOR.
Hans Mueller
BY
ATTORNEY.

Patented Nov. 17, 1931

1,832,409

UNITED STATES PATENT OFFICE

HANS MUELLER, OF DETROIT, MICHIGAN

BATTERY CARRIER

Application filed August 10, 1929. Serial No. 384,891.

My invention relates to a new and useful improvement in a battery carrier and has for its object the provision of a device whereby batteries may be easily and quickly transported manually from place to place.

Another object of the invention is the provision of a carrier which may be easily and quickly attached to a battery so as to permit its being transported from place to place with maximum convenience.

Another object of the invention is the provision of a battery carrier which may be easily and quickly attached to the battery and which will not easily become unduly detached from the battery.

Another object of the invention is the provision of a battery carrier which may be used with batteries of various sizes.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention.

Fig. 2 is an end elevational view of the invention.

Fig. 3 is a perspective view of a modified form of the invention.

Fig. 4 is a sectional view taken on line 4—4 of Fig. 3.

As is well known storage batteries are provided with handles at opposite ends thereof whereby the battery may be carried, these handles being of a small size permitting entry of the fingers thereinto. Another well known type of battery is provided with a pair of spaced holes in an upstanding lug through which the fingers may be projected for carrying.

The present invention is adapted for use with either type of battery and comprises a gripping portion or main body 7 having the angularly turned end 8 to which is pivotally connected, by the pin 22, the stem 9 of the yoke having the depending yoke arms 10 and 11, each provided with the angularly turned portion 10' and 11' respectively. The opposite end of the main body 7 is angularly turned at 12, this portion 12 forming the stem of the yoke having the yoke arms 13 and 14 each provided with an angularly turned portion 13' and 14'. As shown in the drawings it is preferred to form these parts from channel iron in order to procure a maximum strength with a minimum weight and expense of manufacture. As shown in dotted lines in Fig. 1, the yoke attached to the portion 8 may be swung outwardly, a spring 23 resisting this swinging movement.

When attaching the device to a battery, the yoke on the member 8 is swung outwardly to permit the engagement of the angularly turned ends 13' and 14' in the bail carried by the battery or in the spaced openings formed in the upwardly projecting lug mentioned. The yoke arms 10 and 11 may then be permitted to swing inwardly to engage the angularly turned ends 10' and 11' in the bail or lug openings of the battery. It will be noted that the ends of the angularly turned portions 10' and 11' and 13' and 14' are upwardly offset or angularly turned to prevent their undue displacement or removal from engagement with the bail or openings in the battery.

In Fig. 3 the main body or gripping portion 7' is formed from channel iron having the inwardly projecting flanges 24 and 25. A channel iron member 15 is slidably mounted in telescopic relation on the member 7' and provided with the angularly turned portion 16 of the yoke having the arms 17 and 18 with the ends 17' and 18' angularly turned. The yoke tree 19 constitutes a downwardly turned portion of the member 7' and is provided with the yoke arms 20 and 21, each of which has the inwardly turned portion 20' and 21' respectively, the ends of these inwardly turned portions being upwardly turned as referred to in describing the form shown in Fig. 1. While the form shown in Fig. 1 may be used with batteries of various sizes, the form shown in Fig. 3 permits the device to be used with batteries varying in size to a greater degree by sliding the yoke arms 17 and 18 outwardly as shown in dotted lines in Fig. 3.

With a carrier arranged and constructed as described, a simple and effective means is provided for engaging and carrying a battery.

While I have illustrated and described the preferred form of my invention, I do not wish to limit myself to the precise details of structure shown but desire to avail myself of such variations and modifications as come within the scope of the appended claim.

Having thus described my invention, what I claim as new and desire to secure by Letters Patent is:

A battery carrier of the class described, comprising: a gripping portion formed channel shaped in cross section and having the side walls turned inwardly to provide inwardly projecting flanges; a yoke projecting outwardly from one end of said gripping portion and having its ends turned inwardly to provide engaging means for engaging a battery; a channel iron member slidably engaging in the channel of said gripping portion and longitudinally movable relatively thereto; a yoke depending from one end of said channel arm member and having its ends turned inwardly to provide battery engaging means.

In testimony whereof I have signed the foregoing specification.

HANS MUELLER.